J. J. PAXSON.
Seed Planter.
No. 27,378.
Patented Mar. 6, 1860.
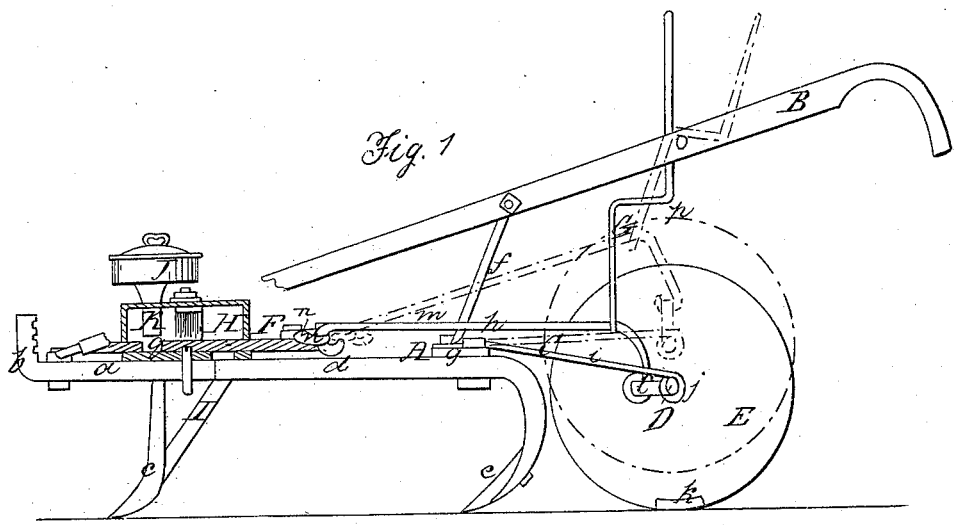
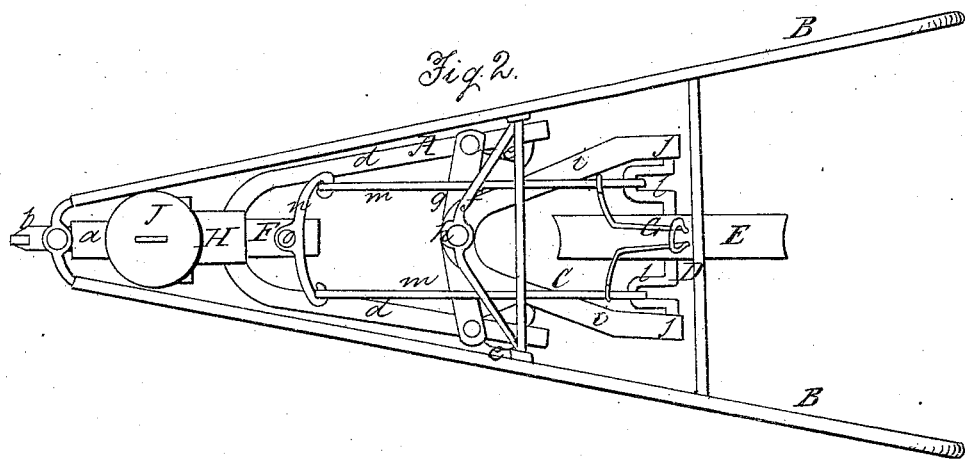

UNITED STATES PATENT OFFICE.

JOHN J. PAXSON, OF MIDDLETOWN, INDIANA.

IMPROVEMENT IN CULTIVATORS.

Specification forming part of Letters Patent No. 27,378, dated March 6, 1860.

*To all whom it may concern:*

Be it known that I, JOHN J. PAXSON, of Middletown, in the county of Henry and State of Indiana, have invented a new and Improved Combination of a Cultivator and Seeding-Machine; and I do hereby declare that the following is a full, clear, and exact description of the same, reference being had to the annexed drawings, making a part of this specification, in which—

Figure 1 is a side view of my invention partly bisected; Fig. 2, a plan or top view of the same.

Similar letters of reference indicate corresponding parts in the two figures.

The object of this invention is to obtain a simple, economical, and compact device in which a cultivator and seeding-machine are combined in such a way that the cultivator may be used separately or with the seed-distributing device as occasion may require, the combination and arrangement of parts admitting of a perfect operation of both devices while the machine is placed under the complete control of the attendant.

The invention consists in attaching to a cultivator-frame a seed-distributing device composed of a reciprocating slide fitted within a suitable seed-box provided with a cut-off, and operated by cranks and connecting-rods from the shaft of a driving-roller which is fitted to an elastic adjustable frame attached to the cultivator-frame, the whole being arranged substantially as hereinafter described to effect the desired result.

To enable those skilled in the art to fully understand and construct my invention, I will proceed to describe it.

A represents a metal cultivator-frame, which is of V shape, with a short straight bar, $a$, attached to its front and smaller end, the outer end of bar $a$ being curved upward and notched to form a clevis, $b$, to receive the draft ring or hook.

To the bar $a$, near its junction with frame A, a cultivator-tooth, $c$, is attached, and the back ends of each bar $d$ of the frame A is curved downward to form feet, to each of which a share or tooth, $e$, is attached. (See Fig. 1.)

B B represent two handles, the front ends of which are connected to bar $a$, and supported about at their centers by braces $f$ from the back part of frame A.

The above-named parts constitute a cultivator, to which more teeth may be added, if necessary.

The bars $d\ d$ of the frame A, near their back ends, are connected by a bar, $g$. To the center of this bar $g$ a V-shaped elastic frame, C, is attached by a bolt, $h$. Each part $i$ of the frame C is a spring, and has considerable elasticity, and at the back or outer end of each spring $i$ there is a bearing, $j$, in which the ends of a shaft, D, are fitted. This shaft forms the axle of a roller or wheel, E, the periphery of which is of a concave form, as shown clearly in Fig. 2. The roller or wheel E at its periphery is notched at a certain point, as shown at $k$, Fig. 1. The object of this will be presently shown.

The shaft or axle D is provided with two cranks, $l\ l$, which have the same position on the shaft, and to each crank one end of a connecting-rod, $m$, is attached, the front ends of said rods being attached by hooks or joints to the ends of a bar, $n$, which is attached by a pivot, $o$, at its center to the back end of a seed-slide, F. The connecting-rods $m\ m$ are curved downward at their back ends, so that they may work free or clear of the frame A.

To the connecting-rods $m\ m$ bents rods G are attached, said rods being connected at their upper ends and bent at about their centers to form a shoulder, $p$, as shown clearly in Fig. 1.

The slide F works through a box, H, which is placed on the bar $a$. This slide has a hole or seed-cell, $q$, made in it, and a cut-off brush, $r$, is placed within the box H. A tube, I, communicates with the box H at its bottom, said tube extending down to the back of the tooth $c$, as shown clearly in Fig. 1.

J is a hopper or seed-box, which is placed above the box H, and communicates with it by means of a tube, K.

The operation is as follows: The hopper or box J is filled with seed, and as the machine is drawn along the cranks $l\ l$ of shaft D, with the connecting-rods $m\ m$, give a reciprocating movement to slide F, and the seed is distributed from the box H through the tube I into the furrow made by tooth $c$. The operation of the slide F and cut-off brush is so well known that a minute description is not necessary, as the above parts constitute the most common seed-distributing device. The elastic frame C permits the roller or wheel E to rise and fall and conform to the inequalities of the surface of the ground, and at the same time admits of the roller being elevated entirely above it, so as to render the seed-distributing device inoperative, the roller being held in an elevated state by passing the shoulder $p$ of the rods G over a cross-bar, $s$, of the handles, as shown in red in Fig. 1. This elevated adjustment of the roller admits of the cultivator being alone used when desired. It also forms a very simple means for preventing the useless distribution of seed in the turning at the ends of rows and in passing over rocky ledges or barren spots. By having the elastic frame C attached to the frame A by a single bolt, $h$, the frame C may be moved laterally in order to give the roller or wheel an oblique position relatively with the frame, and thereby allow the machine to move in a curve when necessary, the arrangement of the connecting-rods $m$ and bar $n$ permitting such adjustment of the frame without interfering with the transmission of motion from the shaft D to the slide F.

The notch $k$ in the periphery of the roller or wheel E shows the position of slide F, and enables the attendant always to start the machine correctly at the commencement of rows, in order that the seed may be sown evenly in check-rows, the hole or seed-cell $q$ being in line with tube K when the notch $k$ is directly under the axle D of the roller or wheel.

I do not claim any parts pertaining to the seed-distributing device, for that is old and well known; nor do I claim the cultivator in itself considered; but I do claim as new and desire to secure by Letters Patent—

The attaching of the roller or wheel F to an elastic frame, C, connected to the cultivator-frame A by a bolt, $h$, and communicating motion to the slide F from the shaft or axle D by means of cranks $l\ l$ and connecting-rods $m\ m$, attached to the ends of the pivoted bar $n$ on the slide F, the whole being arranged as and for the purpose set forth.

JOHN J. PAXSON.

Witnesses:
 JESSE WEST,
 M. M. MURPHY.